(No Model.)
J. W. ALLEN.
PLANTER ATTACHMENT.
No. 552,225. Patented Dec. 31, 1895.
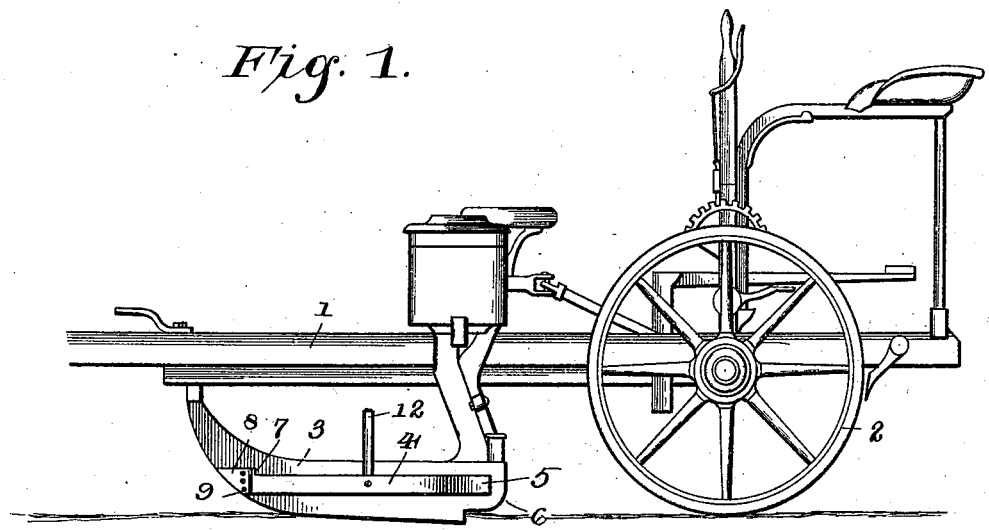
Fig. 1.
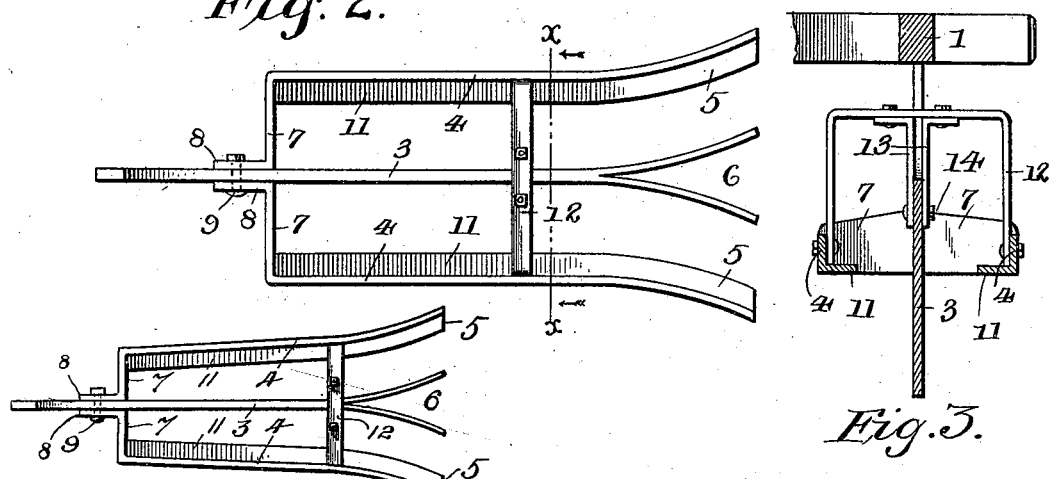
Fig. 2.
Fig. 3.
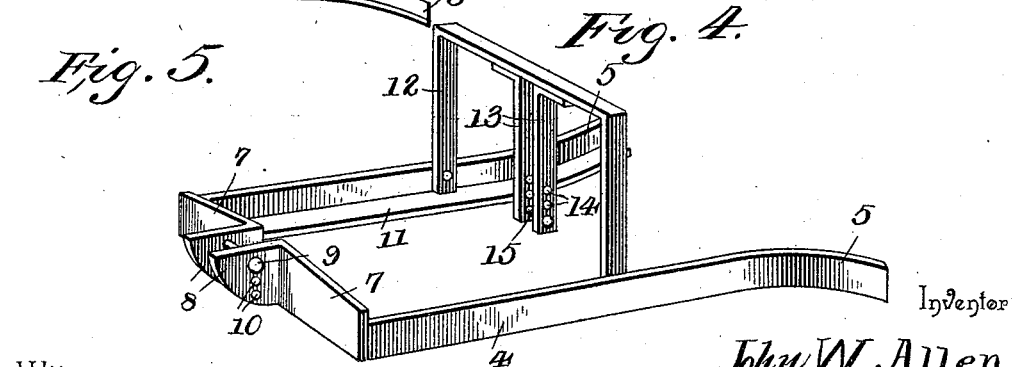
Fig. 5.
Fig. 4.
Witnesses
Chas. A. Ford
Harold H. Simms
Inventor
John W. Allen,
By his Attorneys,
C. A. Snow & Co.

UNITED STATES PATENT OFFICE.

JOHN W. ALLEN, OF ST. JOHN'S, OHIO.

PLANTER ATTACHMENT.

SPECIFICATION forming part of Letters Patent No. 552,225, dated December 31, 1895.

Application filed August 19, 1895. Serial No. 559,800. (No model.)

*To all whom it may concern:*

Be it known that I, JOHN W. ALLEN, a citizen of the United States, residing at St. John's, in the county of Auglaize and State of Ohio, have invented a new and useful Planter Attachment, of which the following is a specification.

This invention aims to provide an attachment for planters to level the ground and regulate the depth of sowing or planting the seed.

The attachment is especially designed to be applied to that class of planters having runners, which latter have the appliance adjustably fitted thereto. Inasmuch as the invention will be generally used in connection with corn-planters, it is illustrated in the accompanying drawings in connection with a corn-planter of ordinary construction.

Other objects and advantages, such as appertain to inventions of this character, are contemplated and will be apparent from the following description and the drawings hereto attached, in which—

Figure 1 is a side elevation of a corn-planter, showing the invention applied. Fig. 2 is a top plan view of a runner equipped with the attachment. Fig. 3 is a cross-section on the line X X of Fig. 2, looking to the left, as indicated by the arrow. Fig. 4 is a detail perspective view of the attachment. Fig. 5 is a modification.

The planter herein shown is of usual construction, and comprises a frame 1, which is mounted upon wheels 2 and runners 3. The attachment is fitted to each runner, and comprises similar longitudinal bars 4, which extend for the greater part of their length in substantially parallel relation, the rear end portions 5 curving in opposite directions to conform to the separated or bifurcated end 6 of the runner. The front ends 7 of the longitudinal bars are bent inwardly at about right angles to the length of the said bars and have their extremities 8 bent forwardly to lie against opposite sides of the runner 3, and to which they are adjustably secured by means of a fastening 9, the latter passing through one of a series of vertically-disposed openings 10 in the forwardly-extending ends 8. The inwardly-extending ends 7 form levelers on each side of the runner 3, and their lower edges are in the same plane with the lower faces of the longitudinal bars 4. The top edges of the parts 7 may be straight or curved, as desired, and the same is true of the top edges of the longitudinal bars 4. The longitudinal bars are L-shaped in cross-section and are disposed with the horizontal portions 11 extending inwardly, so as to present an unobstructed vertical side on the outer faces of the said bars 4, and these inwardly-extending flanges 11 serve to strengthen the bars and provide an extended bearing, so as to prevent them from sinking into the ground.

An arch 12 is connected at its lower ends to the longitudinal bars 4 about midway of their ends, and hangers 13, secured at their upper ends to the horizontal portion of the arch 12, have their vertical portions arranged to come upon opposite sides of the runner 3, and these hangers are formed in their lower-end portions with a vertical series of openings 14 through which passes a bolt or fastening 15, by means of which attachment is had between the said hangers and the runner 3. By having the attachment adjustably connected with the runner the latter can be caused to penetrate the ground to a greater or less depth, according to the depth at which it is required to plant the seed.

The longitudinal bars may, if desired, be arranged to converge slightly at their front ends, and this construction is preferred, inasmuch as it affords clearance in the operation of the implement and prevents the soil clinging to the bars and a consequent clogging thereof when the planter is in operation. The hangers may be connected at their lower ends with the longitudinal bars at any convenient point, and, as shown in Fig. 5, they have attachment with the said longitudinal bars at a point about two-thirds of their length. This view also shows the longitudinal bars slightly converging at their front ends.

In adapting the invention to the different forms and makes of planters it is to be understood that various changes in the form, proportion, and the minor details of construction may be resorted to without departing from the principle or sacrificing any of the advantages of this invention.

Having thus described the invention, what is claimed as new is—

1. In a planter, the combination with the runner, of an attachment for leveling the ground and regulating the depth of penetration therein of the runner, the same comprising longitudinal bars extending substantially parallel with the runner and having inwardly-extending portions at their front ends and disposed one upon each side of the runner, an arch connecting the longitudinal bars in the rear of their front ends, and means for positively and adjustably connecting the front ends of the longitudinal bars and the arch with the runner, substantially as set forth for the purpose described.

2. In a planter, the combination with the runner, of a leveling and depth-regulating attachment comprising similar longitudinal bars arranged upon opposite sides of the runner and having inwardly-extending portions at their front ends which are adjustably connected with the runner, an arch connecting the longitudinal bars in the rear of their front ends, hangers pendent from the arch and adjustably connected with the runner, and means for adjustably and positively connecting the attachment with the said runner, substantially as and for the purpose set forth.

3. In a planter, the combination with a runner, of a leveling and depth-regulating attachment comprising similar longitudinal bars arranged upon opposite sides of the runner and having their rear end portions oppositely curved, and provided at their front ends with inwardly-extending portions which terminate in forward extensions having a vertical series of openings, an arch connecting the longitudinal bars and having pendent hangers formed in their lower end portions with a vertical series of openings, and fastenings for adjustably connecting the hangers and the forward extensions with the said runner, substantially as and for the purpose described.

4. The combination with the runner of a planter, of a leveling and depth-regulating attachment comprising similar longitudinal bars having inwardly-extending portions at their lower edges, and having inwardly-extending parts at their front ends which terminate in forward extensions provided with a vertical series of openings, an arch connecting the longitudinal bars between their ends, hangers pendent from the horizontal portion of the arch and having a vertical series of openings in their lower portions, and fastenings for adjustably connecting the attachment with the runner, substantially in the manner set forth for the purpose described.

In testimony that I claim the foregoing as my own I have hereto affixed my signature in the presence of two witnesses.

JOHN W. ALLEN.

Witnesses:
W. L. McKEE,
C. A. STUEVE.